United States Patent [19]
Chan

[11] Patent Number: 5,937,525
[45] Date of Patent: Aug. 17, 1999

[54] CITRUS FRUIT PULP CUTTER

[75] Inventor: Siu Kei Chan, Tsuen Wan, The Hong Kong Special Administrative Region of the People's Republic of China

[73] Assignee: Kai On Wong, The Hong Kong Special Administrative Region of the People's Republic of China

[21] Appl. No.: 09/081,490

[22] Filed: May 18, 1998

[51] Int. Cl.⁶ ..................................................... A23N 15/06

[52] U.S. Cl. ........................................... 30/123.6; 30/114

[58] Field of Search ..................................... 30/114, 123.5, 30/123.6, 123.7; 99/537, 541, 584

[56] References Cited

U.S. PATENT DOCUMENTS 2,463,167  3/1949  Ghisletta ................................. 30/123.6

*Primary Examiner*—Douglas D. Watts
*Attorney, Agent, or Firm*—Miller, Sisson, Chapman & Nash, P.C.

[57] ABSTRACT

A cutting device for segmenting and derinding a half section of citrus fruit in order to collect the pulp segments thereof comprises an open-top container to which an annular member fits. A plurality of slicers are supported by the member to form an upstanding cage. A semi-circular cutting blade is constrained and arranged to be turned by a handle through an arc which extends closely adjacent inner surfaces of the slicers. A half section of citrus fruit is pressed onto the cage in use, to segment the pulp, and the blade rotated through 180° to cut away the pulp.

6 Claims, 5 Drawing Sheets

5,937,525

CITRUS FRUIT PULP CUTTER

The present invention relates to citrus fruit pulp cutters.

DESCRIPTION OF PRIOR ART

It is often required to serve or prepare citrus fruit that has been peeled and segmented for eating or mixing into a fruit salad with other fruits. Generally in homes and restaurants, it is usual to prepare the citrus fruit in relatively small quantities, this enables the fruit to remain fresh and prepared "on-demand", or at least within a few hours of consumption. A suitable cutter has already been proposed in U.S. Pat. No. 4,959,903, in which pulp is removed from a half orange, or other citrus fruit, by pushing an open face of the half orange onto the top of upstanding slicers and then rotating the outside of the orange so that the pulp is cut away from inside. The rotation of the orange is manually difficult in some circumstances.

SUMMARY OF THE INVENTION

It is an object of this invention to overcome or at least reduce the problem.

According to the invention there is provided a cutting device for segmenting and derinding a half section of a citrus fruit, in order to collect the pulp segments thereof, said cutting device comprising an annular member having a central longitudinal axis, an upstanding hemispherical cage formed by evenly spaced apart semicircular slicers anchored at each end to the annular member that meet at an apex on the longitudinal axis, a semi-circular cutting blade supported at its ends to pivot about an axis that lies adjacent a plane of the annular member and extends transverse to the longitudinal axis and such that blade is constrained to move through an arc closely adjacent and within inner surfaces of slicers of the cage, and a manual operator arranged to move the cutting blade through said arc, such that in use the half section of fruit is first pushed over the cage so that the slicers cut into the pulp and then the cutting blade is manually moved to cut away the pulp.

Preferably, the cutting blade is connected at one end to a stub axle and the operator is connected directly to the axle.

The cutting device may include a semi-spherical lid arranged in use to fit over an outside surface of the half section of citrus fruit.

In a preferred embodiment, the cutting device includes a ring positioned below the annular member for supporting the cutting blade.

More preferably, brackets are provided on the ring for holding the ends of the cutting blade.

It is preferred that the operator is provided on one side of the cutting blade for turning about the transverse axis.

In a preferred construction, the cutting blade is reinforced by means of a support provided within the blade.

More preferably, the support has an inverted T-shape and is in engagement with opposite ends and a central part of the blade.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
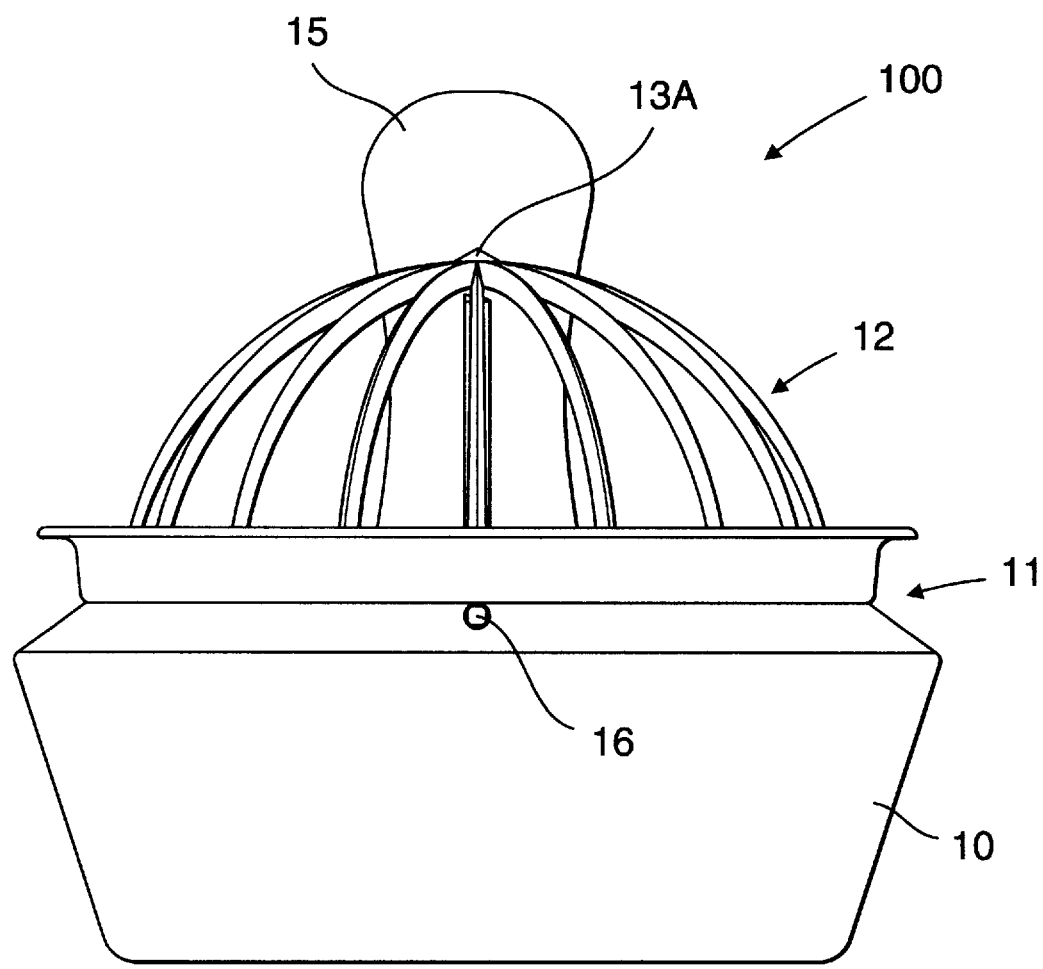
FIG. 1 is a side view of an embodiment of a cutting device in accordance with the invention.
Figure 2:
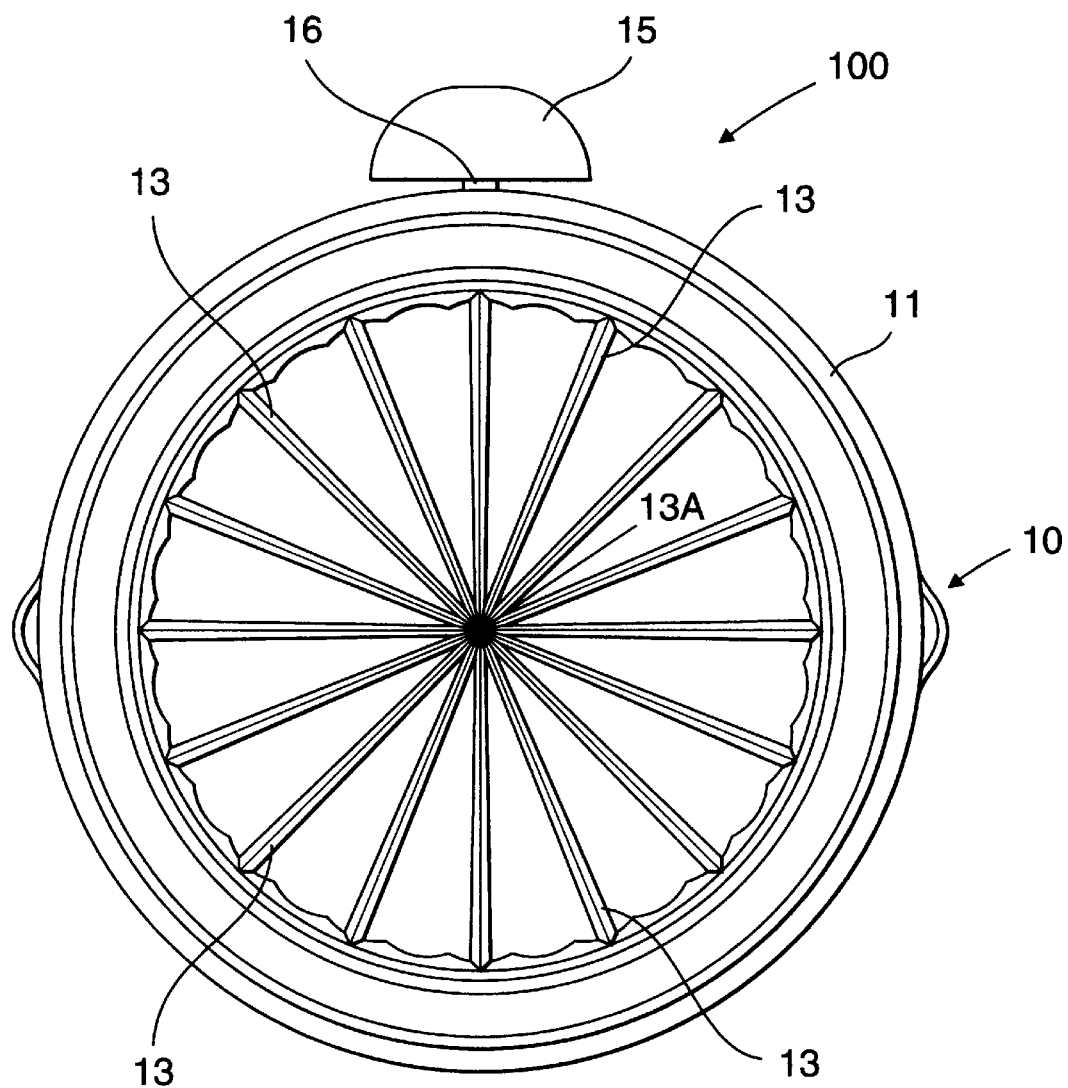
FIG. 2 is a top plan view of the cutting device of FIG. 1.
Figure 3:
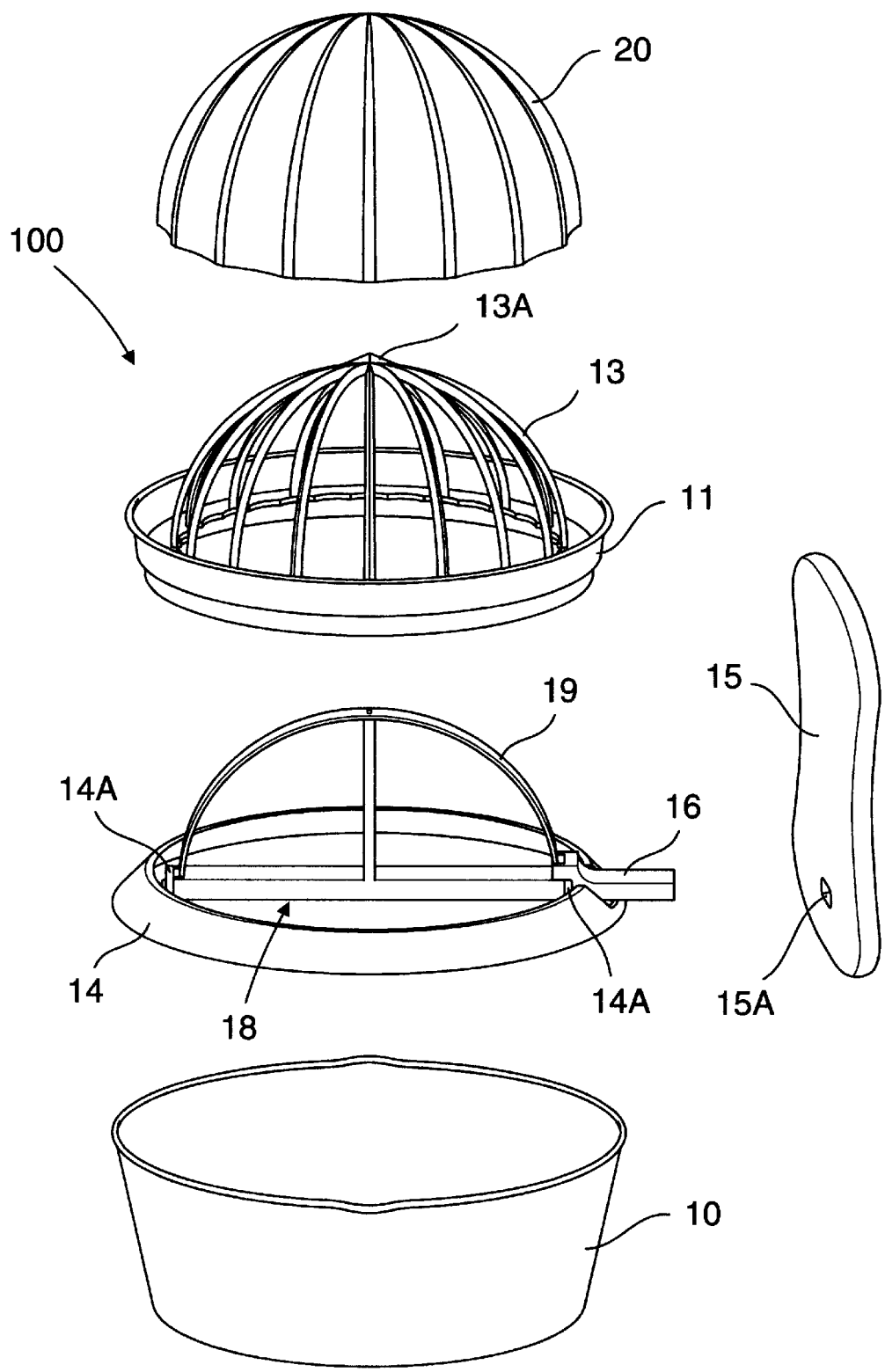
FIG. 3 is an exploded isometric view of the cutting device of FIG. 1, showing inter alia a semi-circular cutting blade.

Referring firstly to FIGS. 1 to 3 of the drawings, there is shown a cutting device 100 embodying the invention, which device includes an open-top base 10 and a horizontal annular member 11 provided with an upstanding hemispherical cage 12 for use on the base 10. The cage 12 is formed of eight evenly spaced apart semi-circular slicers 13 anchored at each end to the annular member 11. The slicers 13 meet at a central apex 13A and are triangular in cross-section for cutting into the pulp of a half section of orange pressed down against and through the cage 12.

A handle 15 is provided on one side of the cutting device 100, which is mounted on a horizontal stub axle 16 for turning. The outer end of the stub axle 16 is square in cross-section, and the handle 15 has a square aperture 15A for engaging the stub axle 16 by the outer end.

Figure 4:
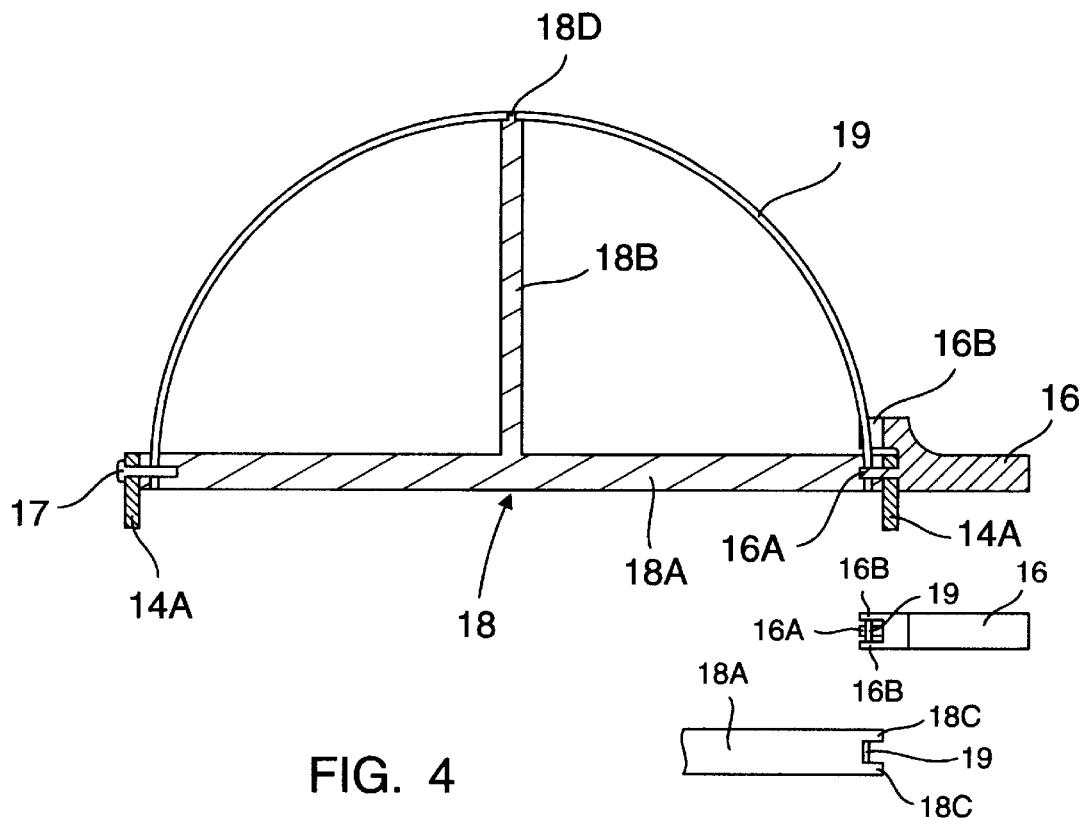
FIG. 4 consists of a cross-sectional view of the cutting blade of FIG. 3 and two partial top plan views of related parts.

The cutting device 100 includes a semi-circular metal cutting blade 19 supported for pivotal movement on a horizontal circular plastic ring 14 for use between the base 10 and the annular member 11. As shown in FIG. 4, the cutting blade 19 is reinforced by means of an inverted T-shaped support 18 having a rod body 18A and a perpendicular central arm 18B. The rod body 18A has opposite bifurcate ends 18C, and is arranged to extend across opposite ends of the blade 19 and engage with the blade ends by means of the ends bifurcate 18C. The arm 18B has a reduced end 18D engaging through an apex hole of the blade 19. The support 18 is thus provided within the blade 19 in a co-planar manner.

The cutting blade 19 and support 18 are supported by means of a pair of integral brackets 14A formed on opposite sides of the ring 14. At the inner end, the stub axle 16 has a co-axial stud 16A and a bifurcate part 16B above the stud 16A. The stud 16A engages co-axially with one end of the support body 18A and the associated end of the blade 19 through one bracket 14A, with the bifurcate part 16B holding the blade 19 at a position slightly above. A pin 17 is used to hinge the opposite ends of the support body 18A and blade 19 through the other bracket 14A.

This arrangement enables turning of the cutting blade 19, with the support 18, through an arc of 180° about a horizontal axis through the brackets 14A. The blade 19 is constrained to move through the arc closely adjacent and within inner surfaces of the slicers 13.

A lid 20 is shown in FIG. 3 that in use fits over the half section of an orange so that the user can more easily press the orange evenly onto the cutting device 100 and hold the orange firmly down in position during operation.

Figure 5:
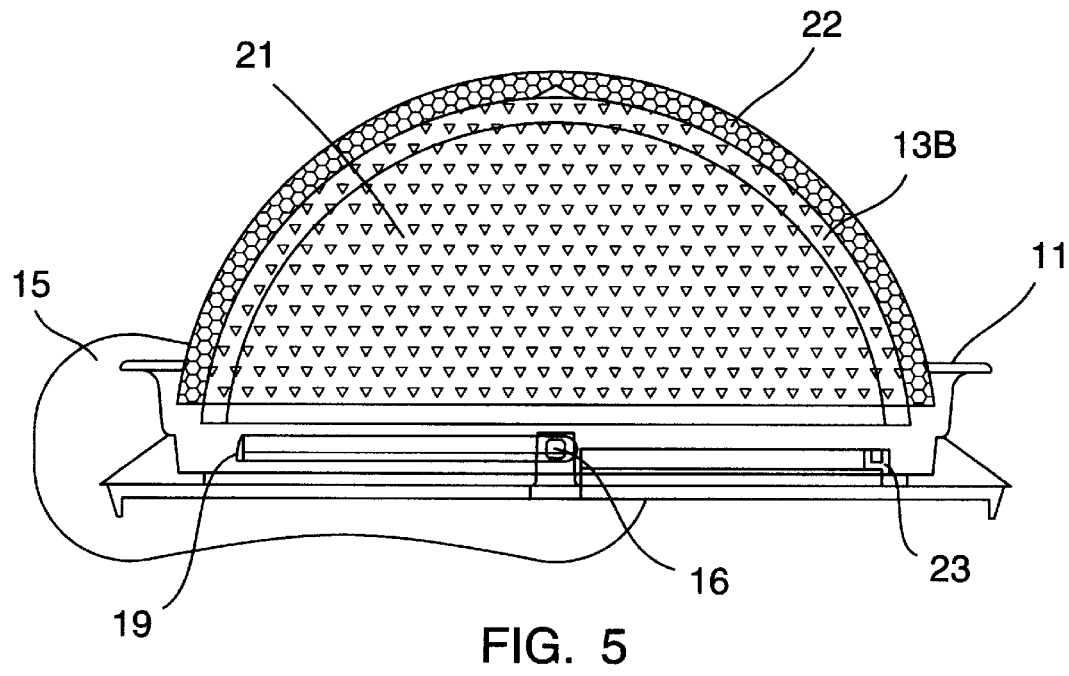
FIG. 5 is a diagrammatic cross-sectional side view of the cutting device of FIG. 1 and half an orange to be cut by the cutting blade of FIG. 4.
Figure 6:
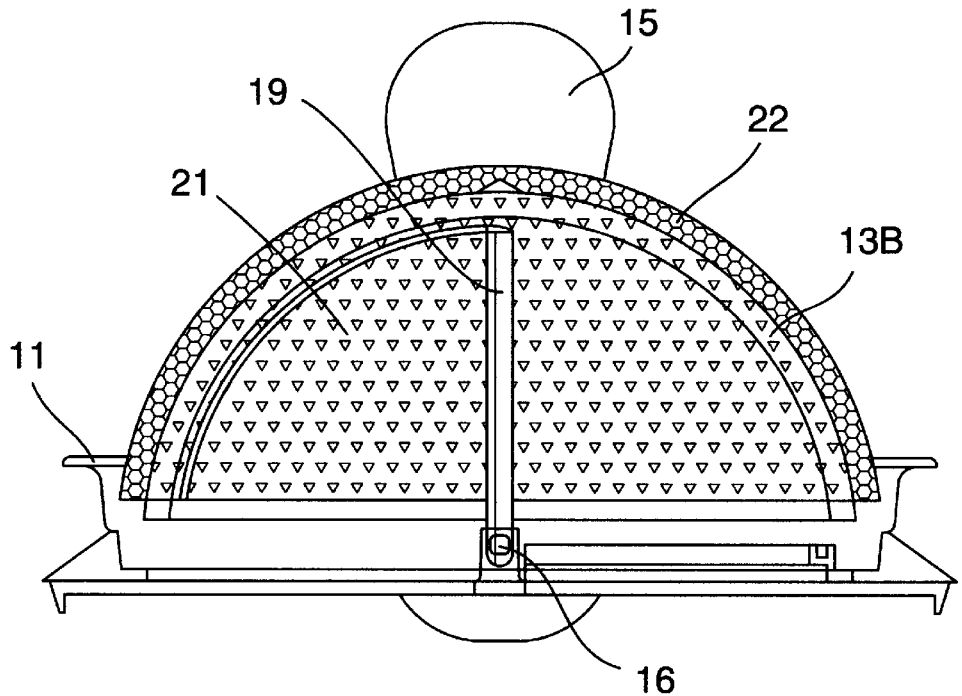
FIGS. 6 and 7 correspond to FIG. 5, showing the cutting blade in different positions.
Figure 7:
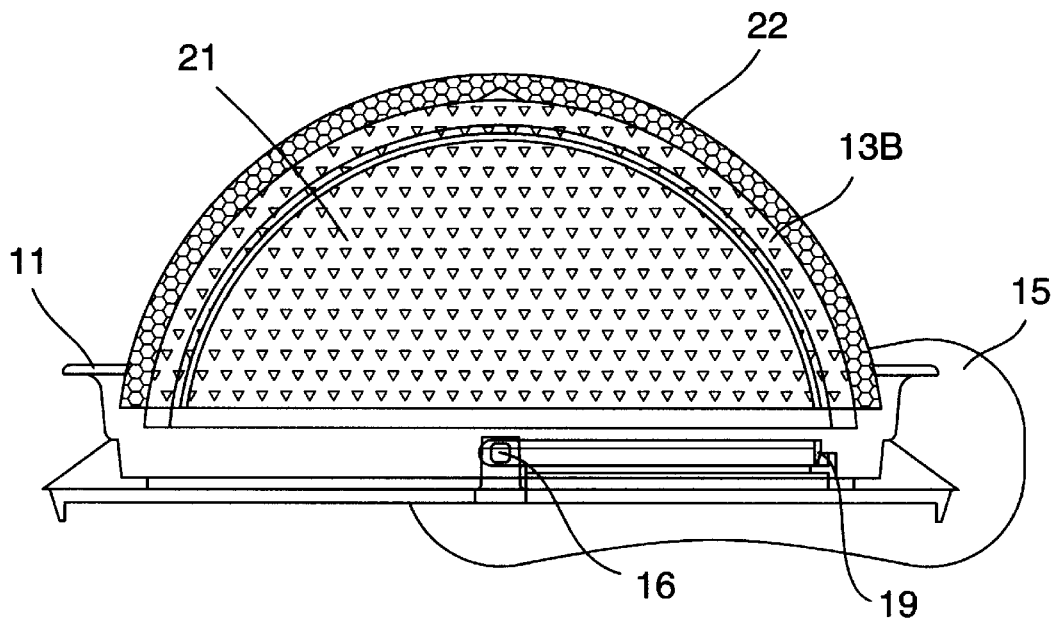

FIGS. 5, 6 and 7 show three different positions of the cutting blade 19. The orange has an inner part or pulp 21 and a layer of rind 22. In these figures, the half section of orange is shown to have been pressed onto the cage 12 so that the slicers 13 have sliced through the pulp 21 and rest against the rind 22 (only one slicer represented as 13B is seen). Starting at FIG. 4, the cutting blade 19 is pivoted by turning the handle 15 so that the blade 19 moves in an arc of 180° through the intermediate position of FIG. 6 to the final position of FIG. 7. The segmented and derinded pulp 21 will then fall into the base 10 for collection and future use. A buffer stop 23 is provided to receive the cutting edge of the blade 19 when the blade 19 has completed its 180° arc of movement.

During the cutting operation, the slicer 13B, which is lying perpendicular to the arm 18B of the support 18, will cut open a planar gap in the pulp 21 for the arm 18B to pass through without obstruction.

It will be appreciated that other citrus fruit can be likewise segmented and removed from their skins. For larger fruit, such as grapefruit, a larger cutting device can be provided using the same mechanism as described.

It is also possible to use a double handle if preferred which takes the form of a basket handle. The double handle fits to opposite sides of the cutting device 100 and moves in use in an arc over the top of the lid 20. The cutting blade 19 may also be double-edged so that it will also cut the pulp away from the orange just as easily by being moved from its position shown in FIG. 7 to its position shown in FIG. 5.

The invention has been given by way of example only, and various modifications of and/or alterations to the described embodiment may be made by persons skilled in the art without departing from the scope of the invention as specified in the appended claims.

What is claimed:

1. A cutting device for segmenting and derinding a half section of a citrus fruit, in order to collect the pulp segments thereof, said cutting device comprising:

an annular member having a central longitudinal axis;

an upstanding hemispherical cage formed by evenly spaced apart semi-circular slicers anchored at each end to said annular member that meet at an apex on said longitudinal axis;

semi-circular cutting blade supported at its ends to pivot about an axis that lies adjacent a plane of said annular member and extends transverse to said longitudinal axis and such that said cutting blade is constrained to move through an arc closely adjacent and within inner surfaces of slicers of said cage;

a manual operator arranged to move said cutting blade through said arc, such that in use said half section of fruit is first pushed over said cage so that said slicers cut into said pulp and then said cutting blade is manually moved to cut away said pulp, said cutting blade connected at one end to a stub axle and said operator connected directly to said axle; and a semi-spherical lid arranged in use to fit over an outside surface of said half section of citrus fruit.

2. A cutting device according to claim 1, including a ring positioned below said annular member for supporting said cutting blade.

3. A cutting device according to claim 2, further comprising: brackets on said ring for holding said cutting blade.

4. A cutting device according to claim 1, wherein said operator is provided on one side of said cutting blade for turning about said transverse axis.

5. A cutting device according to claim 1, wherein said cutting blade is reinforced by means of a support provided within said blade.

6. A cutting device according to claim 5, where said support has an inverted T-shape and is in engagement with opposite ends and a central part of said blade.

* * * * *